Figure 1:
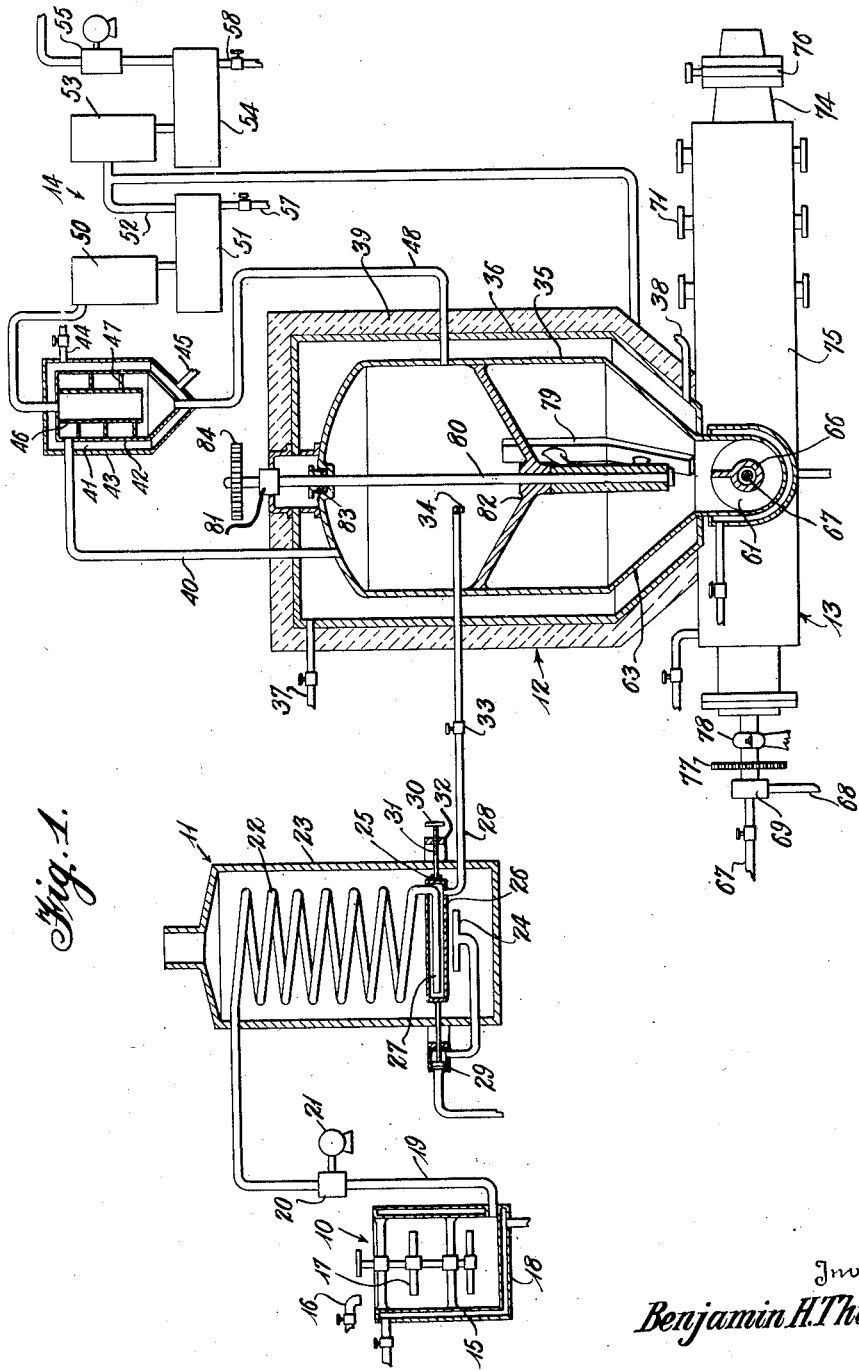

Jan. 3, 1939. B. H. THURMAN 2,142,984
EVAPORATING MECHANISM AND PROCESS
Filed Aug. 4, 1937 2 Sheets-Sheet 1

Inventor
Benjamin H. Thurman
By Harris, Kiech, Foster & Harris
Attorneys

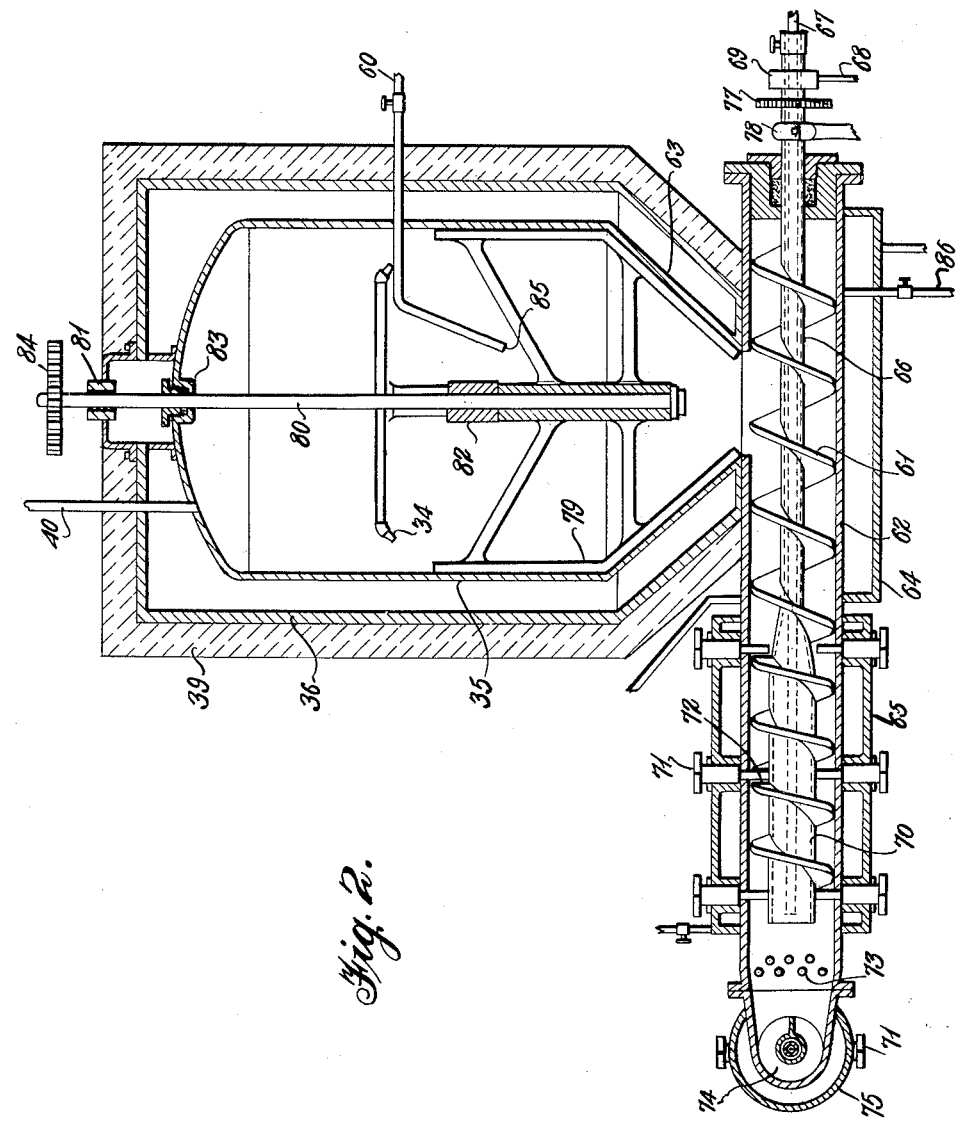

Patented Jan. 3, 1939

2,142,984

UNITED STATES PATENT OFFICE 2,142,984

EVAPORATING MECHANISM AND PROCESS

Benjamin H. Thurman, Bronxville, N. Y., assignor to Refining, Inc., Reno, Nev., a corporation of Nevada Application August 4, 1937, Serial No. 157,410

11 Claims. (Cl. 159—2)

This invention relates to an apparatus and process for separating volatiles from solid and semi-solid material and more particularly to an apparatus and processes for evaporating volatiles from solid and semi-solid material and removing material from which the volatiles have been separated in the evaporating zone.

The present apparatus and process is capable of general application wherever it is necessary to remove volatiles from solid or semi-solid material and provides for the continuous removal of such material from an evaporating zone and cooling, if necessary, while maintaining the materials out of contact with the air and sealing the evaporating zone from the atmosphere. Thus, materials which cannot be pumped and which would be injured by the air at high temperatures can be cooled while being pushed from the evaporating zone.

The invention further provides for quickly heating the material to be separated and maintaining it out of contact with the air during evaporation. The evaporation may be carried on in a vacuum, if this is necessary to remove the volatiles, and in the event that the volatiles are valuable products, they may be condensed and recovered. The entire process may be performed in a relatively short time so that materials, which are injured by being subjected to high temperatures over considerable periods of time, can be heated, the volatiles removed and the materials cooled and discharged without injury. The invention provides for accurate and sensitive control of the temperature throughout all portions of the process and for the handling of material which is sticky and viscous, as well as powdered, after the volatiles have been removed.

It is, therefore, an object of the present invention to provide a process and apparatus by which volatile materials may be removed from solid or semi-solid materials and the temperatures throughout the process controlled to avoid injuring the material.

Another object is to provide a process and apparatus by which any type of material containing volatiles and solids or semi-solids may be treated to remove the volatiles, and the temperature, time of treatment and evaporating conditions controlled in accordance with the materials being treated.

Another object of the invention is to provide a process and apparatus whereby solid or semi-solid materials resulting from an evaporation step may be continuously removed from an evaporating zone without contacting the same with the atmosphere before their temperature has been reduced.

A further object of the invention is to provide a process by which volatiles and solid or semi-solid materials can be continuously separated and removed from a vacuum evaporating zone without breaking the vacuum.

A further object of the invention is to provide an apparatus which is capable of continuously removing materials difficult to handle from a vacuum chamber without allowing air to enter the same.

Other objects and advantages of the invention will appear in the following description of the process and of the apparatus shown in the attached drawings, in which, Figure 1 is a schematic drawing of the complete apparatus; and Figure 2 is a vertical section of a suitable form of evaporating chamber and conveying mechanism.

The apparatus shown in Figure 1 includes in general, a source of supply 10 for the material to be treated, a heating device 11, an evaporating chamber 12 provided with a conveying mechanism 13, and a condensing system 14. The material to be treated, which may be any mixture of volatiles and solid or semi-solid materials, may be introduced into the tank 15, forming part of the source of supply 11, through a pipe 16. The tank 15 is preferably provided with an agitator 17 for maintaining the mixture substantially uniform, and suitable heating means, such as a heating jacket 18 for preheating the material therein. The material to be treated is withdrawn through the pipe 19 from the storage tank 15 by the pump 20, driven by the motor 21, and forced by the pump through a heating coil 22 positioned in a casing 23 and forming part of the heating device 11. The heating coil 22 may be heated in any desired manner, for example, by a burner 24 for gas or liquid fuel. Preferably the heated mixture being discharged from the coil 22 is passed through a heat regulator or thermostat 25, positioned in the lower part of the casing 23 and having an outer hollow member 26 into which a pipe 27 forming a continuation of the coil 22 extends. As will be understood from Figure 1, the heated materials discharged into the hollow member 26 through the pipe 27 are forced to make a reverse turn and flow between the pipe 27 and the walls of the hollow member 26. The materials are discharged from the thermostatic device 25 through a pipe 28. The hollow member 26 is also positioned so as to be contacted by the products of combustion from the burner 24 and the temperature of the hollow member 26 will depend upon both the temperatures of the heated mixture leaving the coil 22 and the temperature of the products of combustion. In the present device the hollow member 26 is employed as the thermostatic element. A valve 29 is attached to one end of the hollow member 26 and the other end of the hollow member is adjustably positioned in the device by a hand wheel 30 rigidly attached to a shaft 31 screw threaded through a member 32 attached to the casing 23. The shaft 32 is rotatably attached to the hollow member 26 so that the longitudinal position of the hollow member 26 can be adjusted. Expansion of the hollow member 26 due to increase in temperature, partly closes the valve 29 to reduce the amount of fuel delivered to the burner 24 and contraction thereof due to reduction of temperature increases the amount of fuel. The normal position of the valve 29 can be varied by the hand wheel 30 so that the thermostatic device 25 functions to maintain the temperature of the heated material from the coil 22 substantially constant.

Any desired pressure may be maintained in the coil 22 by adjusting the valve 33 in the pipe 28 through which the heated mixture is delivered to nozzles 34 positioned in the evaporating chamber 12. That is, any desired pressure may be imposed by the pump 20 and maintained by the valve 33. The pump 20 not only forces the material through the coil 22 and into the evaporating chamber but provides an extremely efficient mixing of the materials from the source of supply 10, by breaking up any agglomerations in the mixture and more uniformly dispersing the volatiles and solid or semi-solid materials. The velocity through the coil 22 is maintained sufficiently great to keep the materials admixed and prevent local overheating to provide for efficient heat transfer thereto.

The evaporating chamber 12 includes an inner casing 35 which is closed to the atmosphere. Preferably a heating jacket 36 is provided around the evaporating chamber to provide for accurate control of the temperature of the casing 35. Pipes 37 and 38, communicating with the heating jacket, are provided for the introduction and withdrawal of any desired heating material, such as steam or heated mineral oil. Also a layer of insulating material 39 may be provided around the heating jacket 36. As more clearly shown in Fig. 2, the nozzles 34 through which the material is delivered into the evaporating chamber are preferably positioned so as to discharge the mixture from the coil 22 against the heated walls of the inner casing 35 of the evaporating chamber 12 so that the material, if it remains liquid after being sprayed into the evaporating chamber, flows down the walls in a thin film to assist in the liberation of vapors. In addition, this provides for a substantially unobstructed vapor path for vapors leaving the evaporating chamber as they do not have to pass through a spray of material entering the evaporating chamber. Alternatively, the nozzles 34 may be directed upwardly or in any desired direction, depending upon the material being treated, so that the solid or semi-solid materials are deposited in the lower portions of the evaporating chamber.

Vapors are withdrawn from the evaporating chamber through a pipe 40 and delivered into a suitable vapor separator 41. Preferably the vapor separator includes a casing 42 surrounded by a heating jacket 43 to prevent condensation of vapors in the vapor separator. Pipes 44 and 45 are provided for the introduction and withdrawal of a suitable heating medium, such as steam or heated mineral oil. The vapor separator also preferably includes a central cylindrical baffle 46 surrounded by a helical vapor passage formed by the vane 47 so that the gases entering through pipe 40 are forced to follow a helical path and then make an abrupt turn upwardly in order to throw entrained liquid or solid materials out of the vapors. Such separated liquid or solid materials are returned to the evaporating chamber 12 through a pipe 48.

If it is desired to maintain a vacuum in the evaporating chamber or condense the vapors to recover valuable products, the vapors may be delivered to a condenser 50 provided with a receiver 51. If fractional condensation is desired, part of the vapors from the first condenser 50 may be delivered through a pipe 52 from the receiver 51 to a second condenser 53 provided with a receiver 54. A vacuum pump 55 may also be provided to maintain a vacuum throughout the condensing system and the evaporating chamber, if the materials being treated require evaporation in a vacuum. Condensed materials may be removed from the receivers 51 and 54 through the pipes 57 and 58 by pumps (not shown) or otherwise and suitable cooling means (not shown) may be provided for the condensers 50 and 53 in order to control the temperatures therein. As many condensers may be provided as is necessary or desirable to recover various fractions of condensed material. For operation at atmospheric pressures in the evaporating chamber the vacuum pump may be eliminated and if no condensation of the vapors is required, the condensing system may also be eliminated.

In order to add heat to the evaporating chamber in addition to or in substitution for that added by the heating jacket 36, a pipe 60 (Fig. 2) is provided through which any desired heated material can be introduced into the evaporating chamber. Thus steam, preferably superheated, may be injected into the evaporating chamber and to not only supply heat thereto but assist in carrying over vapors liberated from the materials delivered into the evaporating chamber from the nozzles 34.

In order to remove the solid or semi-solid materials deposited in the evaporating chamber, a screw conveyor 61 provided with a housing 62 is employed. The housing 62 opens into the lower portion of the evaporating chamber 12, which is preferably provided with inclined walls 63 adjacent the bottom thereof for directing the material into the conveyor housing. The conveyor housing 62 is secured to the inner casing 35 of the evaporating chamber 12 in airtight relation and may be provided with heat exchange jackets 64 and 65 for heating or cooling the materials within the conveyor depending upon the material being discharged by the conveyor. Also the conveyor 61 is preferably provided with a hollow shaft 66 through which a pipe 67 extends. Any suitable heating or cooling medium may be introduced through the pipe 67 to flow in a reverse direction through the hollow shaft 66 and be discharged through a pipe 68 connected to the hollow shaft by means of suitable packing gland 69. The shaft at the discharge end 70 of the conveyor 61 is preferably enlarged so that the materials being discharged therefrom are forced through a tapered and constricted passage between the shaft and the conveyor housing in order to form a plug or seal to prevent air from entering the evaporating chamber 12. It is also advantageous to reduce the pitch of the screw adjacent the enlarged end 70 of the conveyor shaft as shown in Fig. 2, to further assist in maintaining an airseal. This structure is particularly advantageous when a vacuum is maintained in the evaporating chamber. Many types of materials, particularly viscous semi-solid materials, tend to adhere to the conveyor 61 and rotate therewith so that they are not advanced by the conveyor. It has been found that stationary members 71 projecting through the housing 62 and into slots 72 formed in the vanes of the conveyor screw, overcome this difficulty and cause the material to be continuously advanced along the conveyor. As an aid in further forming an air seal in the conveyor a grid made up of small pipes 73 extending through the discharge end of the conveyor housing, has been found effective. The material is forced through this grid in small streams and by flowing a heating or cooling medium through the pipes forming the grid, the temperature of the material being discharged can be still further controlled. Also the conveyor in conjunction with the stationary member 69 and the grid 71 breaks up and works the material passing through the same. If the material is relatively dry and capable of being broken up it is discharged from the conveyor in the form of particles or if the material is in a plastic state, it is thoroughly mixed and plasticized.

If it is found necessary to still further work or cool the material discharged from the first conveyor, it may be delivered into a second screw conveyor 74 of the same type as the conveyor 61. The second conveyor may also be provided with a heating or cooling jacket 75 and stationary members 71. If necessary, additional conveyors (not shown) may be provided in order to condition the material for contact with the atmosphere. The final conveyor is preferably provided with a valve 76 in order to form an air seal in starting up the apparatus before a plug or seal of material has been formed in the conveyors. This valve will normally be opened during the continuous operation of the device. The conveyors may be rotated from any convenient source of power through the sprockets 77, and suitable bearings 78 are provided for the exterior end of the shaft, but no bearings have been found necessary for the discharge end of the shafts.

For many types of material, a scraper or agitator 79 is provided for insuring that the materials deposited in the evaporating chamber 12 are delivered into the conveyor housing 62. The shaft 80 of the scraper may be journaled in bearings 81 and 82 and passed through a packing gland 83 for sealing the evaporating chamber 12 from the atmosphere. The agitator may be driven from any suitable source of power through the sprocket 84. The evaporating chamber and associated scraper or agitator 79 is particularly adapted for handling materials deposited as a viscous and sticky material. If desired, the end 85 of the steam pipe 60 may be directed downwardly in the direction of the discharge from the evaporating chamber so that heat can be applied directly to the material being discharged as well as through the inclined walls 63, in order to soften certain types of material and render them capable of being discharged from the chamber.

With certain types of materials, a portion of the non-volatiles are in a liquid condition and can be discharged through a pipe 86, leading from the conveyor housing. If the unvaporized material also includes solids which can be separated from the unvaporized liquid by the conveyor 61, solids may be discharged by means of the conveyor and liquids by the pipe 86.

In carrying out the process of the present invention the materials are pumped under pressure through the heating coil 22 by means of the pump 21. The materials are preferably preheated in the tank 10 to as high temperatures as possible without substantial vaporization or injury to the materials when in contact with the atmosphere and are then heated in the coil 22 to a temperature which will cause liberation of volatile materials when they are discharged into the evaporating chamber 12. The pressure maintained in the coil 22 should be sufficient to reach the desired temperature and may be sufficient to retain the materials in the heating coil in liquid phase. However, with materials requiring large amounts of heat to vaporize the same, it is frequently desirable to form vapors in the heating coil since more heat can thereby be imparted to the materials. This can be done by raising the temperature for a given pressure or reducing the pressure for a given temperature. Thus a mixture of vapors and volatile material along with non-volatile material can be delivered into the evaporating chamber. In order to vaporize the volatile material which has not been vaporized in the coil, heat in addition to that contained in the material delivered into the evaporating chamber, may be supplied by means of the heating jacket 36 or by injecting steam through the pipe 60 or by both of these expedients. As before indicated, the vapors may be discharged to the atmosphere or they may be condensed in the condenser system 14. If fractional condensation is desired, several condensers operating at different temperatures may be provided or a fractionation column employed. With certain materials which are very sensitive to heat, it is desirable to apply very little heat in the coil 33 and depend upon a vacuum in the evaporating chamber for volatilization. Thus the heating coil may be employed merely to further mix the materials or in certain instances may be entirely eliminated. In some instances all of the heat necessary for vaporization may be supplied from the heating jacket 35 or by steam from the pipe 60 or both or in case of a volatile material easily evaporated in the vacuum without heat, either or both of these heating means may be dispensed with.

The heating or cooling jackets 64 and 65, as well as the grid 73 and the hollow shaft 66 of the conveyor, may be employed to control the temperature of the material in the conveyor so that it is in proper condition for movement through the conveyor and discharge to the atmosphere. For heavy thermo-plastic materials which become difficult to discharge upon cooling, heat may be applied throughout the length of the conveyor and for other materials which would be in liquid condition unless cooled, a cooling medium may be circulated through either or both of these jackets as well as the grid 71 and the hollow shaft 66 in order to make the material sufficiently solid to seal the evaporating chamber or to cool it sufficiently so that it will not be deleteriously affected by contact with the air.

Many different types of materials may be treated by the process and apparatus of the present invention. Thus volatiles, such as turpentine, may be removed from rosin by pumping the same through the coil 22 and increasing the temperature of the material therein so that the turpentine will evaporate in the evaporating chamber. For this operation a vacuum is unnecessary in the evaporating chamber but lower temperatures and more efficient operation is insured by maintaining a vacuum therein. The turpentine and other volatiles removed for vaporization can then be fractionally condensed in the condensing system in order to produce a substantially pure turpentine. Since many rosins are too viscous to be pumped at ordinary temperatures they may be preheated to make them fluid before delivering the same to the tank 10 forming the source of supply or may be preheated in the tank 10. In this operation it is desirable to direct the materials from the nozzle 34 against heated walls in the evaporating chamber and these walls should be at sufficiently high temperature to keep the rosin fluid. As rosin is ordinarily of brittle solid substance the temperature in the conveyor housing 62 may be maintained high enough to keep the rosin in a plastic condition during discharge or alternatively, the conveyor may be made of sufficiently rigid construction that the cooled and solidified rosin in the conveyor is milled and broken up into particles before discharge. In this case it is desirable to employ two conveyors and to discharge the rosin from the first conveyor in a plastic condition and from the second conveyor in a solid condition.

Vegetable casein is another material which is difficult to process but which can be handled by the present process and apparatus. In dehydration of vegetable casein, for example, soya bean casein, it is now the practice to wash the said casein recovered from soya beans with acetone in order to remove its water. The casein cannot be heated while wet to temperatures sufficient to evaporate the water at atmospheric pressure without the casein becoming insoluble. In accordance with the present invention the water may be removed by slightly heating the wet casein and spraying the same into a very high vacuum. The water vapors may be condensed in the condensing system 14 in order to maintain the vacuum and the dry casein may be removed continuously from the evaporating chamber by the conveyor 61. Alternatively, acetone may be mixed with the wet casein in a closed container and the mixture pumped into the vacuum chamber. The acetone and water will vaporize at a very low temperature under high vacuum conditions. The acetone vapors may be separately condensed either in a separate condenser or by fractionation and the liquid acetone reused. Acetone is highly inflammable and explosive but by maintaining the entire system entirely closed from the atmosphere, the present process provides a safe and economical method of employing acetone as an aid in removing water from vegetable casein. The process can be made entirely continuous and kept entirely closed by returning liquid acetone and injecting the same into a flowing stream of vegetable casein, for example, into the pipe leading to the coil 22. In this manner the acetone is substantially completely admixed with the casein and is again vaporized in the evaporating chamber and condensed for reuse.

Also various synthetic resins may be dehydrated or organic solvents removed therefrom by heating a stream of the same in the heating coil 22 and discharging the heated stream into the evaporating chamber. The temperature employed and the degree of vacuum necessary in the evaporating chamber will depend upon the particular substance being treated. Solvents may be recovered in the condensing system for reuse and the deposited resin removed by the conveyor 61. The temperature in the conveyor will again depend upon the particular material being treated.

The apparatus and process of the present invention also finds utility in separating glycerine from admixture with fatty acids or from admixture with other materials, such as soap from soap making processes. Glycerine may also be separated from the glycerine waters from soap making or from winers or brewers fermentation slops containing large amounts of organic substances. In separating and recovering glycerine, extremely high temperatures are necessary, that is, temperatures in the neighborhood of 450° F. and high vacuum conditions must be maintained in the evaporating chamber. The solid material, such as soap or tars from fat splitting processes, or residues from fermentation slops, are continuously removed from the evaporating chamber by the conveyor system either in a plastic or dry solid form.

As another example of the practice of the present invention molasses can be dehydrated and reduced to a powder. In this form it can be shipped more economically and can very easily be incorporated with other materials as a stock feed. The powdered residue deposited in the evaporating chamber is continuously removed by the conveyor in marketable form. Other substances susceptible of being dehydrated by the present process and apparatus are starches, insecticides, gelatin, etc. Relatively low temperatures and a high vacuum can be employed in such dehydration processes, if the material being dehydrated is deleteriously affected by temperatures above the boiling point of water. Other uses of the present invention will suggest themselves to the man skilled in the art as the apparatus and process disclosed is capable of being employed with many other materials.

For example, the apparatus and process of the present invention is particularly effective in the distillation of fatty acids from glyceride splitting operations or other sources. Such fatty acids are frequently dark in color and may contain unsplit glycerides and in many cases solid or semi-solid impurities. The acids are also subject to thermal decomposition if exposed to the high temperatures necessary for distillation for extended periods of time or if allowed to contact the atmosphere at these high temperatures. By the present invention the fatty acids can be rapidly heated in the heating device shown and then discharged into the evaporating chamber wherein a vacuum is maintained and the temperature somewhat reduced by vaporization of fatty acids or expansion of vapors already formed. Sufficient heat can be imparted to the mixture of fatty acids in the heating chamber so that all of the fatty acids are evaporated in the evaporating chamber. No additional heat need be applied in the chamber although the introduction of steam into the chamber is desirable. Sufficient pressure may be maintained in the heating coil to keep the fatty acids in liquid form therein but a lower pressure in the heating coil such that at least a part of the fatty acids are vaporized therein provides for easier liberation of vapors in the evaporating chamber. Also the temperature necessary to be reached in the heating coil in order to accomplish substantially complete vaporization in the evaporating zone may be somewhat lower as more heat can be imparted to the mixture at a given temperature if vapors are allowed to form in the heating zone. Solid or semi-solid impurities can be forced from the evaporating chamber by the conveyor mechanism without breaking the vacuum. The fatty acid vapors, along with water vapors, if water is present in the fatty acid mixture or steam is employed, are withdrawn from the evaporating chamber and condensed in the condensing system. The fatty acids can be fractionated if desired by employing a plurality of condensers or a fractionating column, or they may all be condensed in a single condenser.

The present process and apparatus is also applicable to the distillation of fatty acids from acidulated soap stock. In the refining of vegetable oils with alkaline reagents a mixture of soap and various organic materials is separated from the refined oil by gravity settling or centrifugal separation. For example, cotton seed soap stock contains large amounts of organic matter such as gums, resins, phosphatides, etc., and is ordinarily a brown viscous material. By treating this material with a mineral acid such as sulfuric acid the soap may be decomposed to liberate fatty acids. By making the apparatus of the present invention of corrosion resistant material, the acidulated mixture may be treated by the present process to distill off the fatty acids under vacuum conditions and the residual organic matter continuously removed from the evaporating zone by the conveying system disclosed.

In any of the examples above described, the heating of the materials can be accomplished in an extremely brief period of time and the small stream and rapid flow thereof during heating provides for efficient agitation of the material and the prevention of any local overheating. Enough heat can be imparted to the materials, that substantially complete vaporization can be accomplished substantially instantaneously in the evaporating zone irrespective of whether vapors are formed in the heating coil. The vaporization in the evaporating chamber or expansion of vapors therein will produce an instantaneous drop in temperature so that the period of high temperature treatment may be extremely brief. Some drop in temperature in the evaporating zone is ordinarily experienced even though additional heat is applied to the evaporating zone either by a heating jacket or the introduction of steam. The application of additional heat to the evaporating chamber is, in many instances, desirable as the drop in temperature in the chamber can thereby be controlled and condensation of any materials it is desired to withdraw in vapor form can be prevented in the evaporating chamber.

Liquid, solid or semi-solid materials which are not vaporized can be withdrawn from the evaporating zone in a continuous manner, if desired, and the evaporating zone sealed from the atmosphere during such withdrawal. Thus a vacuum or any desired pressure can be maintained in the evaporating chamber at all times and the entrance of air thereinto prevented while unvaporizable products are being withdrawn. In certain cases, materials, such as rosin or soap, may be deposited in the evaporating chamber as a molten material and the molten material may be cooled and withdrawn as a solid or semi-solid material by means of the conveyor system. Also, even if the unvaporizable materials are deposited in solid form, they may be cooled before contacting the same with the atmosphere. Thus, the process and apparatus of the present invention is capable of being employed wherever vaporizable materials are to be separated from unvaporizable materials.

While I have disclosed the preferred embodiment of my invention, it is understood that I am not to be limited to the details described but the invention may be varied within the scope of the following claims.

I claim as my invention:

1. A system for separating volatiles from materials which are at least partly liquid at the temperature of separation but which tend to solidify when cooled, which system comprises a heating device, means for flowing a mixture containing said volatiles and said materials through said heating device under pressure to heat said mixture to an extent sufficient to cause said volatiles to be separated in vapor form from said materials when said pressure is reduced, a closed vapor separating chamber, means for delivering the heated mixture into said vapor separating chamber, means for discharging vapors from said chamber at a rate sufficient to maintain a lower pressure therein than in said heating device so as to cause said volatiles to be substantially completely separated from said materials and said materials to be deposited in said chamber in at least partly liquid form, means for continuously pushing said materials from said chamber substantially as soon as deposited, and means for cooling said materials while they are being pushed from the chamber to thicken the same sufficiently to cause the materials to seal said chamber against entrance of air.

2. In a system for separating volatiles from materials which are at least partly liquid at the temperature of separation but which tend to solidify when cooled, a heating device, means for forcing a stream containing said volatiles and said materials under pressure through said heating device, a vapor separating chamber, means for delivering a heated stream into said vapor separating chamber, means for maintaining a vacuum in said chamber and withdrawing vapors liberated therein so as to deposit unvaporized materials in said chamber in at least partly liquid form, means for continuously pushing said unvaporized materials from said vaporizing chamber substantially as soon as deposited therein and means for cooling said materials while they are being pushed from the chamber so as to solidify the same sufficiently to seal said vapor separating chamber to prevent breaking said vacuum.

3. In a system for separating volatiles from materials which are at least partly liquid at the temperature of separation but which tend to solidify when cooled, a heating device, means for pumping a stream containing said volatiles and said materials under pressure through said heating device, a vapor separating chamber, means for delivering the heated stream into said vapor separating chamber to liberate vapors of said volatiles, and deposit unvaporized materials in said chamber in at least partly liquid form, means for withdrawing said vapors from said vapor separating chamber, means for continuously pushing the unvaporized materials from said chamber and means for cooling said unvaporized materials while they are being pushed from said chamber in order to solidify the same sufficiently to seal said chamber against entrance of air.

4. In a system for separating and recovering volatiles from materials which are at least partly liquid at the temperature of separation but which tend to solidify when cooled, a heating device, means for pumping a stream containing said volatiles and said materials under pressure through said heating device, a vapor separating chamber, means for delivering the heated stream into said vapor separating chamber, means for withdrawing vapors from said vapor separating chamber to maintain a pressure therein sufficiently low to cause vapors of said volatiles to be liberated from said materials substantially as soon as said stream is introduced into said chamber including means for condensing said vapors and recovering volatiles in liquid form, means for continuously pushing from the vapor separating chamber unvaporized materials deposited in said vapor separating chamber in at least partly liquid form substantially as soon as said materials are deposited and means for causing said materials to seal said vapor separating chamber from the atmosphere while they are being pushed from the chamber including means for cooling said unvaporized materials sufficiently to at least partly solidify the same.

5. The method of separating vaporizable materials from unvaporizable materials of a type which are at least partly in liquid form at the temperature of separation and after the vaporizable materials have been removed therefrom but which tend to solidify when cooled, said method comprising, passing a mixture of said vaporizable and unvaporizable materials as a stream through a heating zone, heating said mixture in said zone to an extent which will cause said vaporizable materials to be liberated as vapors when said pressure is reduced and the unvaporizable materials to be deposited in said vapor separating zone and at least partly in liquid form, discharging the heated mixture into a vapor separating zone, maintaining a pressure sufficiently low at a temperature sufficiently high in said vapor separating zone to cause vaporizable materials to be liberated as vapors and said unvaporized materials to be deposited in at least partly liquid form in said zone, pushing said deposited materials from said vapor separating zone and cooling the same while they are being pushed from said zone to at least partly solidify said unvaporizable materials to cause the same to seal said vapor separating zone from the atmosphere.

6. The method of separating vaporizable materials from unvaporizable materials of a type which are at least partly in liquid form at the temperature of separation and after the vaporizable materials have been removed therefrom but which tend to solidify when cooled, said method comprising, passing a mixture of said vaporizable and unvaporizable materials as a stream through a heating zone, heating said mixture in said zone to an extent which will cause said vaporizable materials to be liberated as vapors when said pressure is reduced and the unvaporizable materials to be deposited in said vapor separating zone and at least partly in liquid form, discharging the heated mixture into a vapor separating zone, maintaining a pressure sufficiently low at a temperature sufficiently high in said vapor separating zone to cause vaporizable materials to be liberated as vapors and said unvaporized materials to be deposited in at least partly liquid form in said zone, withdrawing said deposited materials from said vapor separating zone by pushing the same therefrom through a constricted passageway, cooling said deposited materials while they are being pushed from said zone to at least partly solidify the same sufficiently to cause said materials to seal said vapor separating zone from the atmosphere during their passage through said constricted passageway.

7. The method of separating volatile materials from non-volatile materials of the type which are at least partly liquid at the temperature of separation but which tend to solidify when cooled which comprises the steps of continuously advancing said materials through a heating zone, heating the materials in said zone to an extent sufficient to cause vapors of said volatile material to be liberated when the material is discharged into a vapor separating zone, continuously introducing the heated materials into a vapor separating zone to separate vapors from said non-volatile material and deposit the non-volatile material in at least partly liquid form in said zone, withdrawing and condensing vapors of said volatile materials and continuously pushing said unvaporized materials from the vapor separating chamber and cooling the same while they are being pushed from said zone sufficiently to at least partly solidify non-volatile materials and cause the same to seal said chamber from the atmosphere.

8. The process of separating vaporizable materials from unvaporizable materials of the type which are at least partly liquid at the temperature of separation but which tend to solidify when cooled which comprises the steps of advancing a mixture of said materials through a heating zone, heating said mixture as it is passed through said zone sufficiently to cause substantially immediate vaporization of the vaporizable materials when introduced into a vacuum zone, continuously introducing the heated materials into said vacuum zone whereby said unvaporizable materials are deposited in at least partly liquid form in said vacuum zone, continuously withdrawing the vaporizable materials from said vacuum zone in the form of vapor at a rate sufficient to maintain said vacuum and continuously pushing unvaporizable material from the vacuum zone substantially as soon as deposited and cooling the same to substantially solid form while they are being pushed from said zone to prevent breaking of said vacuum.

9. The process of separating vaporizable materials from unvaporizable materials which are at least partly in liquid form at the temperature of separation but which tend to solidify when cooled, said process comprising the steps of advancing a mixture containing said materials through a heating zone, heating said materials during passage through said zone sufficiently to cause separation of the vaporizable materials as vapors when introduced into a vacuum zone, continuously introducing the heated materials into said vacuum zone to cause separation of said vaporizable materials and the depositing of said unvaporizable materials in at least partly liquid form in said vacuum zone, continuously withdrawing the vaporizable materials from said vacuum zone in the form of vapor at a rate sufficient to maintain said vacuum, continuously withdrawing the unvaporized material from said vacuum zone substantially as soon as deposited therein and continuously extruding and cooling said unvaporizable material to at least partly solidify the same and form a vacuum seal for said vacuum zone.

10. In a system for separating volatiles from materials which are thermo-plastic when separated from said volatiles: a heating device, means for pumping a stream containing said volatiles and said materials under pressure through said heating device, a vapor separating chamber, means for delivering the heated stream into said vapor separating chamber to liberate vapors of said volatiles and deposit unvaporized materials in said chamber, means for withdrawing said vapors from said vapor separating chamber, means for continuously pushing the unvaporized materials from said chamber and means for adjusting the temperature of said materials while they are being pushed from said chamber in order to render them plastic so as to be capable of being removed while sealing said chamber against the entrance of air.

11. A high speed continuous process for separating vaporizable materials from unvaporizable materials which are damaged by prolonged treatment at elevated temperatures and which are solid or semi-solid at temperatures at which they are stable in contact with the atmosphere, which comprises the steps of: rapidly advancing under superatmospheric pressure a small stream including said materials through an elongated passageway of small cross-section, heating said stream for a brief period during the rapid flow thereof and while the same is in such a state of agitation as to prevent local overheating and to an extent sufficient to cause substantially instantaneous separation of the vaporizable materials, as vapor, when said stream is introduced into a vapor separating zone, continuously introducing the stream into said vapor separating zone, continuously withdrawing the vaporizable materials therefrom in the form of vapor at a rate sufficient to maintain a vacuum in said zone, and continuously pushing the unvaporizable materials from said vapor separating zone substantially as soon as deposited therein and cooling the same to a temperature at which they are stable in contact with the atmosphere while they are being pushed from said zone and are substantially free of vaporizable materials and before contact with the atmosphere.

BENJAMIN H. THURMAN.